US008655973B2

(12) United States Patent
Sato et al.

(10) Patent No.: US 8,655,973 B2
(45) Date of Patent: Feb. 18, 2014

(54) DEVICE MANAGEMENT SYSTEM

(75) Inventors: Toshitaka Sato, Ibaraki (JP); Yuuki Kasai, Beijing (CN); Masayuki Amano, Hirakata (JP); Tadashi Matsumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 237 days.

(21) Appl. No.: 12/937,781

(22) PCT Filed: Apr. 24, 2009

(86) PCT No.: PCT/JP2009/058196
§ 371 (c)(1),
(2), (4) Date: Oct. 14, 2010

(87) PCT Pub. No.: WO2009/133824
PCT Pub. Date: Nov. 5, 2009

(65) Prior Publication Data
US 2011/0040847 A1 Feb. 17, 2011

(30) Foreign Application Priority Data

Apr. 30, 2008 (JP) ................................. 2008-119227

(51) Int. Cl.
*G06F 15/16* (2006.01)
*G06F 11/00* (2006.01)
(52) U.S. Cl.
USPC ............................ 709/208; 714/4.1; 714/4.11
(58) Field of Classification Search
None
See application file for complete search history.

(56) References Cited

U.S. PATENT DOCUMENTS

| 6,944,785 B2 * | 9/2005 | Gadir et al. ................... 714/4.11 |
| 7,257,656 B1 * | 8/2007 | Culca ............................ 710/106 |
| 2008/0285438 A1 * | 11/2008 | Marathe et al. ............... 370/220 |

FOREIGN PATENT DOCUMENTS

| JP | 2002-183855 A | 6/2002 |
| JP | 2003-50617 A | 2/2003 |
| JP | 2007-96539 A | 4/2007 |
| JP | 2008-15837 A | 1/2008 |
| JP | 2008-181240 A | 8/2008 |

OTHER PUBLICATIONS

International Search Report for the Application No. PCT/JP2009/058196 mailed Jul. 21, 2009.

* cited by examiner

*Primary Examiner* — Joshua Joo
*Assistant Examiner* — Younes Naji
(74) *Attorney, Agent, or Firm* — Renner, Otto, Boisselle & Sklar, LLP

(57) ABSTRACT

A first unit and a second unit manage a plurality of devices (a first device), respectively. In addition, the first and second units, repeat to transmit a keep-alive packet and to confirm a response each other, and thus detect each other's malfunction. When the second unit malfunctions, the first unit detects the malfunction of the second unit and transmits a connection command to the connection unit. The connection unit connects a lower net Nia and a lower net Nib when receiving the connection command. Then, the first unit communicates with the first device as heretofore, and further communicates with a second device via the connection unit. Thus, even if a master unit malfunctions, the device management system can maintain to manage without stopping a management of a slave unit which had been managed by the master unit until then.

16 Claims, 10 Drawing Sheets

DEVICE MANAGEMENT SYSTEM

TECHNICAL FIELD

The present invention relates generally to device management systems, and more particularly to a device management system that manages a plurality of devices arranged and divided into a plurality of management groups.

BACKGROUND ART

In the past, there have been proposed various device management systems for managing (at least either of monitoring or controlling) a plurality of devices, and the device management systems construct a lower-level communication network with respect to each of management groups which are grouped in terms of kinds of devices and arranged places. The plurality of devices are arranged, and are divided into a plurality of management groups. The lower-level communication network is managed by an upper-level communication network. In order to construct such hierarchical communication network, a technology to manage a slave unit by a master unit has been used. In the technology, the slave unit for managing a device (the slave unit integrated with the device is also included) is arranged in the lower-level communication network. The master unit treats the slave unit as a terminal, and is arranged in the upper-level communication network. BACnet protocol (A Data Communication Protocol for Building Automation and Control Networks) is used as a communication protocol between the master and slave units (for example, see Japanese Patent Application Laid-Open No. 2007-96539).

However, if the master unit malfunctions, such old device management system can not maintain a management of a slave unit which had been managed by the master unit until then. As a result, the old device management system has a problem that the slave unit (which had been managed by the malfunctioning master unit) can not maintain managements of devices had been managed until then.

DISCLOSURE OF THE INVENTION

It is an object of the present invention to provide a device management system which can maintain a management of a slave unit had been managed by a master unit until then even if the master unit malfunctions.

A device management system of the present invention manages a plurality of devices arranged and divided into a plurality of management groups. The device management system comprises a plurality of master units, a plurality of slave units, a detecting means, and a connection unit. The plurality of master units are arranged in management groups which are different from each other, and comprise a first master unit arranged in a first management group and a second master unit arranged in a second management group. The plurality of slave units comprise at least one first slave unit arranged in the first management group and at least one second slave unit arranged in the second management group. The first master unit is configured to communicate with the first slave unit by using a first communication network to manage the first slave unit. The second master unit is configured to communicate with the second slave unit by using a second communication network to manage the second slave unit. The first slave unit is connected to a first device arranged in the first management group and manages the first device according to a management of the first master unit. The second slave unit is connected to a second device arranged in the second management group and manages the second device according to a management of the second master unit.

The detecting means detects whether or not the second master unit malfunctions. The connection unit connects the first master unit and the second communication network when receiving a connection command.

The first master unit comprises a connection command transmitting means, a communication means, and a management means. The connection command transmitting means is configured to transmit the connection command to the connection unit when the malfunction of the second master unit is detected by the detecting means. The communication means is configured to communicate with the first slave unit by using the first communication protocol. In addition, the communication means is configured to communicate with the second slave unit by using the second communication network via the connection unit when the first master unit and the second communication network are connected with the connection unit. The management means manages the first slave unit, and further manages the second slave unit communicating with the communication means.

In this configuration, when the second master unit malfunctions, the first master unit and the second communication network are connected with the connection unit, and thereby the first master unit can communicate with the second slave unit with which the second master unit had communicated until then. As a result, the device management system can maintain to manage without stopping to communicate with the second slave unit even if the second master unit malfunctions.

As a preferred embodiment, the communication means is configured to communicate with the first and second slave units by using a superposed signal which is obtained by superposing a signal conforming to a second communication protocol to a signal conforming to a first communication protocol when the first master unit and the second communication network are connected with the connection unit. In this case, the connection unit connects the first master unit and the second communication network via the first communication network when receiving the connection command. The first slave unit comprises a first filter means. The first filter means extracts the signal conforming to the first communication protocol from the superposed signal. The second slave unit comprises a second filter means. The second filter means extracts the signal conforming to the second communication protocol from the superposed signal.

In this configuration, even if the first communication protocol used in the side of the first master unit is different from the second communication protocol used in the side of the second master unit, transmission lines used by the first and second communication protocols can be standardized, and the first master unit can maintain to communicate with the second slave unit, instead of the second master unit.

As another preferred embodiment, the communication means is configured to communicate with the first slave unit according to a first communication protocol by using the first communication network. The communication means is configured to communicate with the second slave unit according to the second communication protocol by using the second communication network via the connection unit when the first master unit and the second communication network are connected with the connection unit.

In this configuration, even if the first communication protocol used in the side of the first master unit is different from the second communication protocol used in the side of the second master unit, the first master unit has a function to communicate with the second slave unit according to the second communication protocol, and thereby the first master unit can maintain to communicate with the second slave unit, instead of the second master unit.

As another preferred embodiment, the connection unit relays a signal transmitted from the first master unit to the second slave unit, and translates a signal conforming to a first communication protocol into a signal conforming to the second communication protocol. In this case, the communication means is configured to transmit the signal conforming to the first communication protocol to the second slave unit via the connection unit when the first master unit and the second communication network are connected with the connection unit.

In this configuration, even if the first communication protocol used in the side of the first master unit is different from the second communication protocol used in the side of the second master unit, and the first master unit does not have a function to communicate according to the second communication protocol, the first master unit can maintain to communicate with the second slave unit, instead of the second master unit.

As more preferred embodiment, the first master unit comprises an address translation means. The address translation means is configured to translate a communication address of the second slave unit so as not to overlap a communication address of the first slave unit. The communication means is configured to transmit a signal using the translated communication address of the second slave unit to the second slave unit via the connection unit when the first master unit and the second communication network are connected with the connection unit. The connection unit relays a signal transmitted from the first master unit to the second slave unit, and translates the translated communication address used in the relayed signal into an original communication address.

In this configuration, even if the communication address of the second slave unit, with which the second master unit had communicated until then, is the same as that of the first slave unit with which the first master unit maintains to communicate, the communication address of the second slave unit is translated so as not to overlap that of the first slave unit. Therefore, since the communication address of the second slave unit can be different from that of the first slave unit, the device management system can distinguish between the first and second slave units in which the same communication address was set.

As furthermore preferred embodiment, the detecting means is a detector separated from each of the plurality of the master units.

In this configuration, the detector separated from each of the master units has a detecting function, and there is no need for each of the master units to comprise the detecting means. Therefore, load of each of the master units can be decreased, compared with the master units of which each has the detecting means.

As furthermore preferred embodiment, the plurality of master units comprise a third master unit which is different from the first and second master units. The detecting means is arranged in the first master unit. The second master unit detects whether or not the third master unit malfunctions when functioning normally. The first master unit starts to detect whether or not the third master unit malfunctions when the malfunction of the second master unit is detected.

In this configuration, even if the second master unit malfunctions, the first master unit starts to detect whether or not the third master unit malfunctions, instead of the second master unit, when detecting the malfunction of the second master unit. Therefore, the device management system can maintain to detect whether or not the third master unit malfunctions.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION (First Embodiment)

In the present invention, monitoring and controlling operations of various types of devices are called "management" of device. Thus, the management of the device means at least either of monitoring or controlling. Then, an entire region, in which managed devices are located, is called "management region" in the present invention. When the management region is divided into a plurality of small regions, one of the small regions is called "area".

The management region is a widely-separated space and corresponds to a space in which many devices are located. The devices are lighting devices, or cooling and heating devices, etc. The widely-separated space is a space like various buildings, a site of multiple dwelling, a group of residential area, a theme park, or a park, etc. The various buildings are an office building, a collective housing, a hospital, a school, a hotel, a gymnasium, an art gallery, a museum, and a shopping center, etc. A plurality of buildings exist in the site of multiple dwelling. A plurality of dwelling units exist in the group of residential area. On the other hand, the area corresponds to each floor or each room of the building, or corresponds to each of partitions obtained by dividing a ground accordingly.

Figure 3:
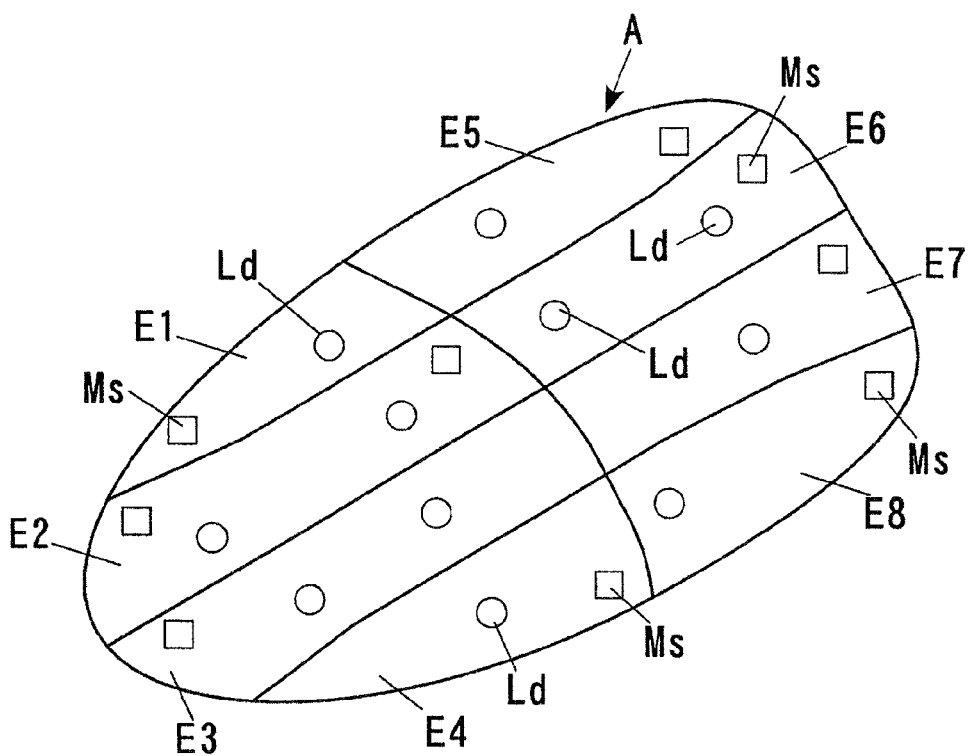
FIG. 3 is a figure showing a relation between a management region and an area according to said first embodiment.

Hereinafter, as shown in FIG. 3, an entire park is explained as a management region A, for example. A ground in the park is divided accordingly, and thereby a plurality of areas E1 to E8 are formed. In the figure, the management region A is divided into eight areas E1 to E8. In addition, the areas E1 to E8 are expressed as areas E when there is no need to distinguish the areas E1 to E8 in particular.

In the embodiment explained below, the devices are lighting devices, and measuring devices for measuring an electricity (electric voltage, electric current, and electric power, etc.). The lighting devices are subject to monitoring and controlling, and the measuring devices are subject to monitoring.

Figure 2:
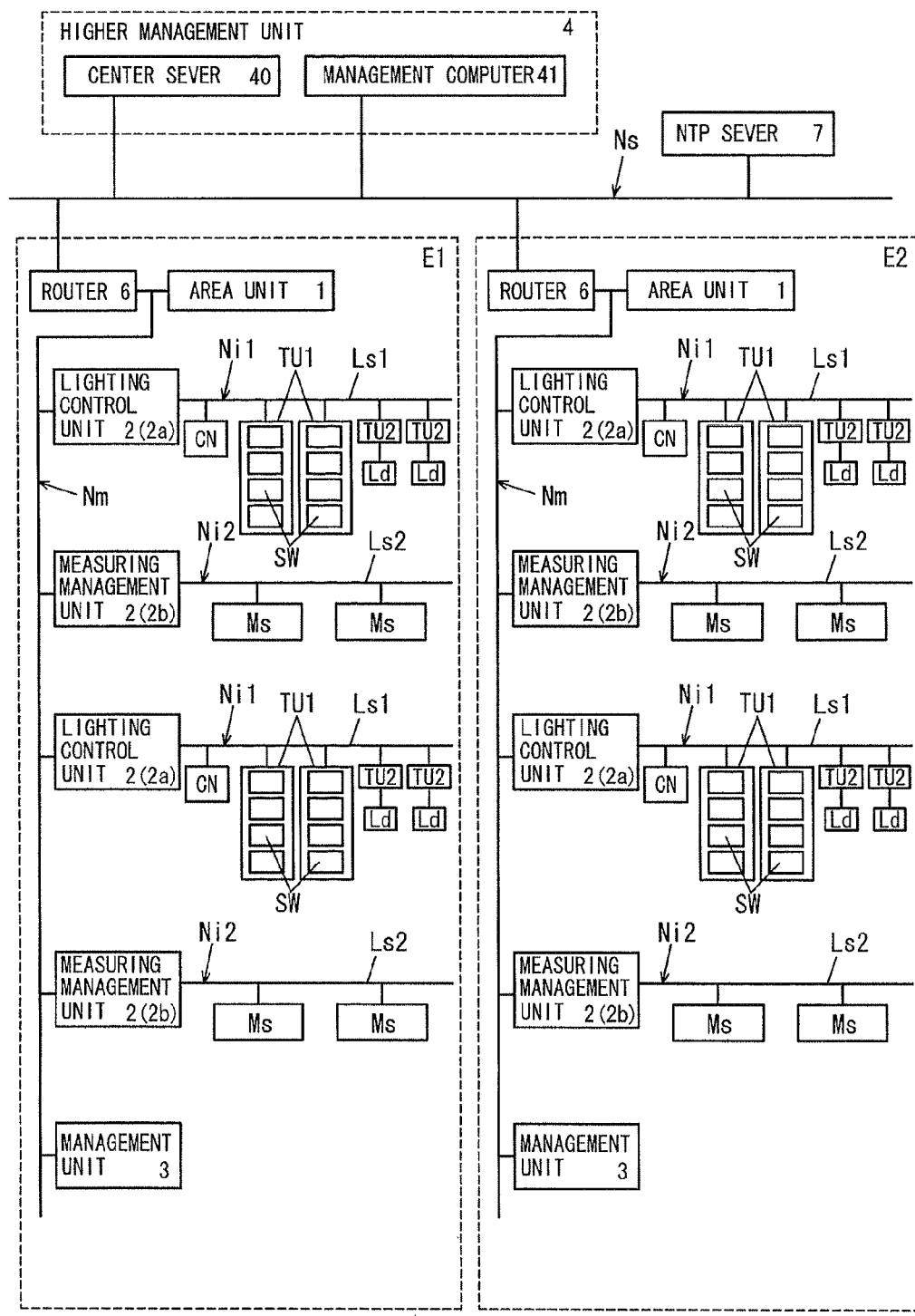
FIG. 2 is an outline drawing of the device management system according to said first embodiment.

A configuration of a device management system of the present embodiment is explained below. The device management system manages the plurality of devices existing in the plurality of areas E1 to E8. As shown in FIG. 2, the device management system comprises a plurality of area units 1 (two area units 1 in the figure), a plurality of units 2 (eight units are shown in the figure, and are four lighting control units 2a and four measuring management units 2b), and a plurality of management units 3 (two management units 3 in the figure). An area unit 1 is arranged in each of the areas E. Each unit 2 manages a device according to the management of either one of the area units 1. Each management unit 3 has configuration information of the area unit 1 described below.

In the device management system of the present embodiment, as shown in FIG. 2, a communication network is used in order to manage various devices. The communication network shown in the figure is hierarchized into three-layer. A middle layer's communication network Nm (hereinafter, called "middle net") is provided with the lighting control unit 2a and the measuring management unit 2b, between lower layer's communication networks Ni1, Ni2 (hereinafter, called "lower net"). A router 6 is located between the middle net Nm and a higher layer's communication network Ns (hereinafter, called "higher net"). The area unit 1 and the management unit 3 are connected to the middle net Nm. In the middle net Nm, IP protocol is used in the network layer and BACnet protocol is used as protocol of the higher layer. The BACnet protocol is a standard open protocol of an equipment Ms.

In the higher net Ns, IP protocol corresponding to IPv6 is used in the network layer, and a specific protocol is used as a protocol of the higher layer. A center server 40 and a management computer 41 are connected to the higher net Ns, and constitute a higher management unit 4. Although the higher net Ns is a local area network, NTP (Network Time Protocol) server 7 is connected to the higher net Ns.

The lower net Ni1 is connected to the lighting control unit 2a, and constructs a communication network of a time-division multiplexed transmission method. In the time-division multiplexed transmission method, a fixed-length transmission signal is used, and is transmitted through two-wire signal line Ls1. The lower net Ni2 is connected to the measuring management unit 2b, and constructs a communication network conforming to a serial communication such as RS-485 or RS-232C, or a communication network conforming to Ethernet (registered trademark), and receives information through a signal line Ls2.

A transmission unit CN, a operation terminal TU1, and a control terminal TU2 are constituent elements of the lower net Ni1. The transmission unit CN passes the fix-length transmission signal along the signal line Ls1 at fixed intervals. The operation terminal TU1 and the control terminal TU2 are connected to the signal line Ls1. The operation terminal TU1 is provided with switches SW. A lighting device Ld is connected to the control terminal TU2. An address corresponding to each of the switches SW is set in the operation terminal TU1, and an address corresponding to the lighting device Ld is set in the control terminal TU2. The transmission unit CN makes the connection between the address of each of the switches SW and the address of the lighting device Ld by using a relation table. Therefore, if either of the switches SW is operated, the lighting device Ld related by the relation table is turned on or off. In addition, if a sensor for detecting a luminance or a sensor for detecting a human body is used instead of the switch SW, the transmission unit CN can control to turn on/off the lighting device Ld according to the luminance or man's existence.

The lighting control unit 2a is connected to the signal line Ls1, and thus can obtain an operation condition of the lighting device Ld by monitoring a transmission signal. In addition, the lighting control unit 2a can perform the same operation as the operation terminal TU1, and can control to turn on/off the lighting device Ld, instead of the switch SW.

The measuring management unit 2b is connected to the signal line Ls2. A measuring device Ms is a constituent element of the lower net Ni2, and is connected to the signal line Ls2. The measuring management unit 2b communicates with the measuring device Ms according to the serial communication, and provides direction with respect to the measuring device Ms, and obtains information from the measuring device Ms. The measuring device Ms measures, for example, an instantaneous value and an integrated value of an electric voltage, an electric current, and an electric power during operation of the lighting device Ld. Therefore, the measuring management unit 2b can monitor the operation of the lighting device Ld by measuring information obtained from the measuring device Ms.

The area unit 1 communicates with the lighting control unit 2a by using after-mentioned configuration information, and thereby can obtain the operation condition of the lighting device Ld, and can provide direction with respect to the operation condition of the lighting device Ld. In addition, the area unit 1 can obtain the measuring information measured by the measuring device Ms via communication with the measuring management unit 2b. The above-mentioned configuration information includes a configuration information data relevant to communication and a configuration information data relevant to device management.

The configuration information data relevant to communication includes an IP address of a source during a communication, an IP address of a destination during the communication, a broadcast address in the areas E, and also has a relation table. The relation table relates an IP address of each unit 2 (the lighting control unit 2a, the measuring management unit 2b) connected to the area unit 1 to a management number. The management number is a number for managing the unit 2 (the lighting control unit 2a, the measuring management unit 2b) individually.

The configuration information data relevant to device management includes information of the maximum number of connectable units (including the area unit 1, the lighting control unit 2a, the measuring management unit 2b, and the management unit 3) in the areas E to which the area unit 1 is connected, and information of the number of units which are actually connected to the areas E.

The area unit 1 requires to obtain the operation condition of the lighting device Ld, being under the control of the lighting control unit 2a, from the lighting control unit 2a. The area unit 1 transmits the obtained operation condition to the higher management unit 4. The area unit 1 requires the lighting control unit 2a to control the lighting device Ld when receiving a control requirement of the lighting device Ld from the higher management unit 4.

The management unit 3 memorizes types and communication addresses of devices (including the lighting device Ld and the measuring device Ms) which are included in the middle net Nm and the lower nets Ni1, Ni2. In addition, the management unit 3 stores configuration information of each area unit 1. Further, the management unit 3 stores a data set in each unit (the lighting control unit 2a, the measuring management unit 2b, and the area unit 1) as a backup data. Because the management unit 3 stores the backup data, the management unit 3 can restore the area unit 1 by transmitting the backup data to the area unit 1 after repair and replacement of the area unit 1.

Figure 1:
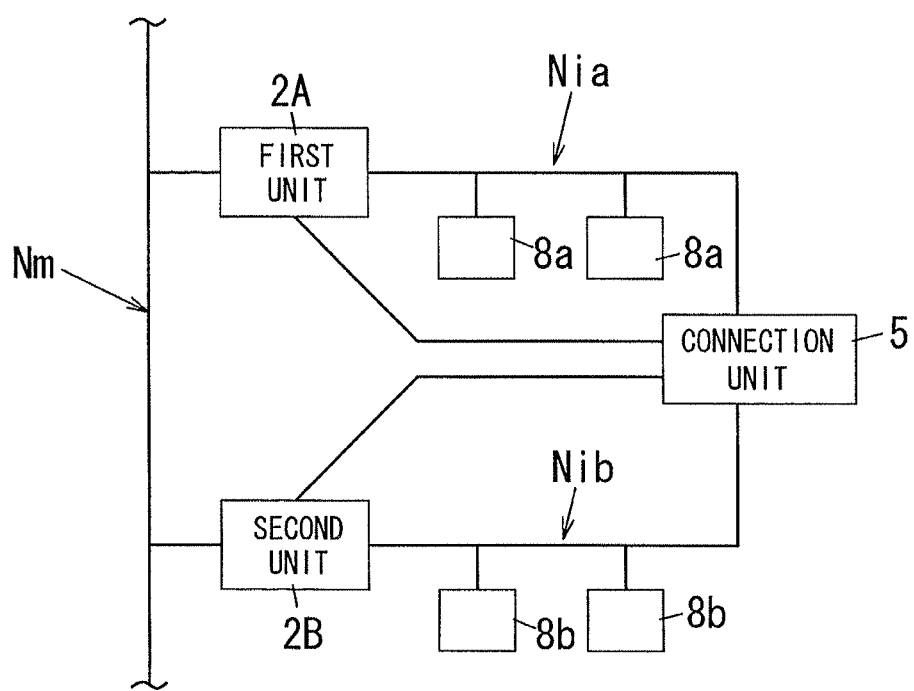
FIG. 1 is a figure showing a main part of a device management system according to first embodiment.

Then, in the device management system of the present embodiment, as shown in FIG. 1, relations between a pair of units 2 (a first unit 2A, a second unit 2B) and a connection unit 5 are explained below. The first and second units 2A, 2B in FIG. 1 are equivalent to the units 2 (the lighting control unit 2a and the measuring management unit 2b) in FIG. 2, respectively. A first device 8a and a second device 8b shown in FIG. 1 are equivalent to the devices connected to the lower nets Ni1, Ni2 shown in FIG. 2, respectively.

In the present embodiment, the first and second units 2A, 2B are the same type of unit. That is, both the first and second units 2A, 2B are the lighting control units 2a, 2a, or the measuring management units 2b, 2b. Hereinafter, the present embodiment is explained to center around the first unit 2A. The second unit 2B can be explained by translating to the phrase shown in parentheses.

Figure 4:
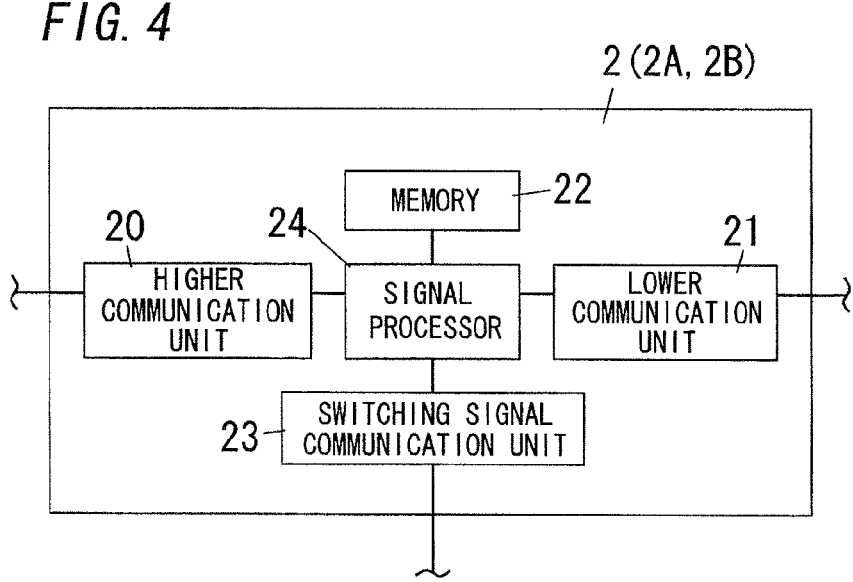
FIG. 4 is a block diagram showing a unit's configuration according to said first embodiment.

As shown in FIG. 4, the first unit 2A (the second unit 2B) comprises a higher communication unit 20, a lower communication unit 21, a memory 22, a switching signal communication unit 23, and a signal processor 24. The higher communication unit 20 communicates with the area unit 1 (see FIG. 2) and the second unit 2B (the first unit 2A) connected to the middle net Nm. The lower communication unit 21 communicates with the first devices 8a, 8a (the second devices 8b, 8b) connected to the lower net Nia (the lower net Nib). The switching signal communication unit 23 communicates with the connection unit 5. The signal processor 24 processes a signal transmitted and received from the first unit 2A (the second unit 2B).

The memory 22 comprises a RAM or a ROM (for example, detachable flash ROM). The memory 22 stores a configuration information used in the communication between the first unit 2A (the second unit 2B) and the first device 8a (the second device 8b). In addition, the memory 22 also stores a configuration information used in the communication between the corresponding second unit 2B (the first unit 2A) and second device 8b (the first device 8a).

The signal processor 24 has a microcomputer as a major component, and comprises a CPU. The signal processor 24 usually controls the lower communication unit 21 so as to communicate with the first devices 8a, 8a (the second devices 8b, 8b) connected to the lower net Nia (the lower net Nib) by using the configuration information memorized in the memory 22 to manage the first devices 8a, 8a (the second devices 8b, 8b).

Then, the signal processor 24 transmits a keep-alive packet to the corresponding second unit 2B (the first unit 2A) by using the higher communication unit 20, and detects from a response to the keep-alive packet whether or not the second unit 2B (the first unit 2A) malfunctions. That is, the signal processor 24 determines that the second unit 2B (the first unit 2A) functions normally, if receiving the response to the keep-alive packet from the second unit 2B (the first unit 2A). On the other hand, the signal processor 24 determines that the second unit 2B (the first unit 2A) malfunctions, if not receiving the response to the keep-alive packet from the second unit 2B (the first unit 2A).

The signal processor 24 controls the switching signal communication unit 23 so as to transmit a switching signal relevant to a connection command for connecting the lower nets Nia and Nib to the connection unit 5 (see FIG. 1) when detecting the malfunction of the second unit 2B (the first unit 2A). When the lower nets Nia and Nib are connected with the connection unit 5, the signal processor 24 starts to control the lower communication unit 21 so as to communicate with the second devices 8b, 8b (the first devices 8a, 8a) which had communicated with the second unit 2B (the first unit 2A) until then by using the configuration information of the second unit 2B (the first unit 2A) to manage the second devices 8b, 8b (the first devices 8a, 8a). The second devices 8b, 8b (the first devices 8a, 8a), which had communicated with the second unit 2B (the first unit 2A) until then, are equivalent to second slave units of the present invention.

Then, the signal processor 24 continues to transmit the keep-alive packet to the second unit 2B (the first unit 2A) even after the second unit 2B (the first unit 2A) malfunctions. Then, the signal processor 24 controls the switching signal communication unit 23 so as to transmit a switching signal relevant to a disconnection command for disconnecting a connection between the lower nets Nia and Nib to the connection unit 5 when detecting a restoration of the second unit 2B (the first unit 2A) via response to the keep-alive packet. The signal processor 24 stops to communicate with the second devices 8b, 8b (the first devices 8a, 8a) which are connected to the lower net Nib (the lower net Nia). Then, the signal processor 24 of the restored second unit 2B (the first unit 2A) restarts to manage the second devices 8b, 8b (the first devices 8a, 8a).

Figure 5:
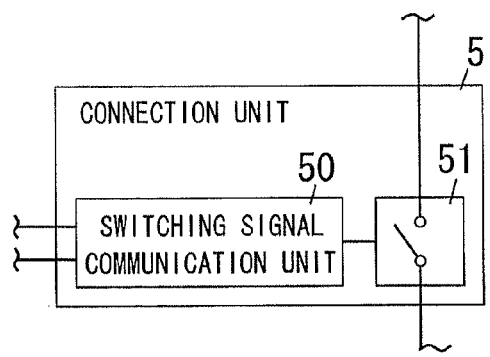
FIG. 5 is a block diagram showing a connection unit's configuration according to said first embodiment.

As shown in FIG. 5, the connection unit 5 comprises a switching signal communication unit 50, and a connection part 51. The switching signal communication unit 50 receives switching signals relevant to the connection command and the disconnection command from the first and second units 2A, 2B. The connection part 51 connects the lower net Nia in the side of the first unit 2A and the lower net Nib in the side of the second unit 2B when the switching signal communication unit 50 receives the connection command. The connection part 51 starts a communication between the first unit 2A (the second unit 2B) and the second devices 8b, 8b (the first devices 8a, 8a) when the lower nets Nia and Nib are connected. The connection part 51 disconnects the connection between the lower nets Nia and Nib when the switching signal communication unit 50 receives the disconnection command.

In the above-mentioned device management system, the first unit 2A are equivalent to a first master unit of the present invention and the second unit 2B are equivalent to a second master unit of the present invention when the second unit 2B malfunctions. The first device 8a is equivalent to a first slave unit and a first device of the present invention, and the second device 8b is equivalent to a second slave unit and a second device of the present invention. The composition element (device group) of the lower net Nia connected to the first unit 2A is equivalent to a first management group of the present invention, and the composition element (device group) of the lower net Nib connected to the second unit 2B is equivalent to a second management group of the present invention. The signal processor 24 of the first unit 2A is equivalent to a detecting means and a management means of the present invention. The lower communication unit 21 of the first unit 2A is equivalent to a communication means of the present invention. The switching signal communication unit 23 of the first unit 2A is equivalent to a connection command transmitting means of the present invention.

On the other hand, the first unit 2A is equivalent to a second master unit of the present invention and the second unit 2B is equivalent to a first master unit of the present invention when the first unit 2B malfunctions. The first device 8a is equivalent to a second slave unit and a second device of the present invention and the second device 8b is equivalent to a first slave unit and a first device of the present invention. The composition element (device group) of the lower net Nia connected to the first unit 2A is equivalent to a second management group of the present invention. The composition element (device group) of the lower net Nib connected to the second unit 2B is equivalent to a first management group of the present invention. The signal processor 24 of the second unit 2B is equivalent to a detecting means and a management means of the present invention. The lower communication unit 21 of the second unit 2B is equivalent to a communication means of the present invention. The switching signal communication unit 23 of the second unit 2B is equivalent to a connection command transmitting means of the present invention.

Figure 6:
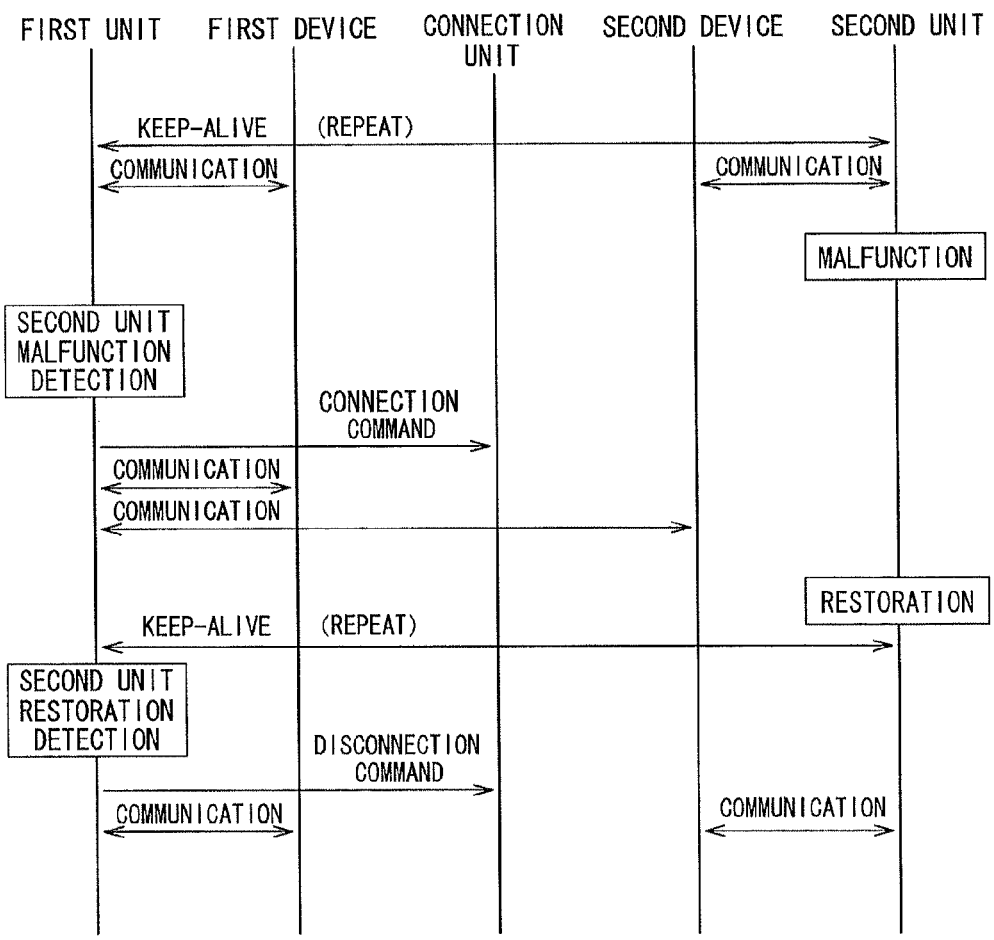
FIG. 6 is a figure for explaining an operation of the device management system according to said first embodiment.

Then, when the second unit 2B malfunctions, an operation of the device management system of the present embodiment is explained below by using FIG. 6. The first unit 2A communicates with the first device 8a, and the second unit 2B communicates with the second device 8b.

At first, the first and second units 2A, 2B repeat to transmit the keep-alive packet and to confirm a response each other, in order to detect each other's malfunction.

Then, when the second unit 2B malfunctions, the first unit 2A detects the malfunction of the second unit 2B and transmits the switching signal relevant to the connection command to the connection unit 5. The connection unit 5 connects the lower net Nia and the lower net Nib when receiving the connection command. Then, the first unit 2A communicates with the first device 8a as heretofore, and further communicates with the second device 8b via the connection unit 5.

Then, when the second unit 2B is restored, the first unit 2A detects the restoration of the second unit 2B and transmits the switching signal relevant to the disconnection command to the connection device 5. The connection unit 5 disconnects the connection between the lower net Nia and the lower net Nib when receiving the disconnection command. Then, the first unit 2A stops to communicate with the second device 8b, and communicates with only the first device 8a. The second unit 2B restarts to communicate with the second device 8b.

As explained above, according to the present embodiment, as shown in FIG. 1, the connection unit 5 connects the lower net Nia in the side of the first unit 2A and the lower net Nib in the side of the second unit 2B, and thereby the first unit 2A (the second unit 2B) can manage the second device 8b (the first device 8a) which had been managed by the second unit 2B (the first unit 2A) until then when the second unit 2B (the first unit 2A) malfunctions. Thus, even if the second unit 2B (the first unit 2A) malfunctions, the device management system can maintain without stopping the management of the second device 8b (the first device 8a) which had been managed by the second unit 2B (the first unit 2A) until then.

(Second Embodiment)

By the way, when the second unit 2B shown in FIG. 1 malfunctions and the first unit 2A communicates with the second device 8b connected to the lower net Nib, the same communication address may be set to the first device 8a connected to the lower net Nia and the second device 8b.

Similarly, when the first unit 2A malfunctions and the second unit 2B communicates with the first device 8a, the same communication address may be set to the first and second devices 8a, 8b.

So, in a device management system of a second embodiment, the signal processor 24 of each unit 2 (the first unit 2A, the second unit 2B) has a function to translate communication addresses of the first and second devices 8a, 8b. The signal processor 24 of the present embodiment is equivalent to an address translation means of the present invention. In addition, the same composition elements as the first embodiment are putted the same numerals on, and the explanation thereof is omitted.

Hereinafter, the present embodiment is explained to center around the first unit 2A. The second unit 2B can be explained by translating to the phrase shown in parentheses. In the present embodiment, the signal processor 24 of the first unit 2A (the second unit 2B) shown in FIG. 4 translates a communication address of the second device 8b (the first device 8a) which had communicated with the malfunctioning second unit 2B (the malfunctioning first unit 2A) so as not to overlap a communication address of the first device 8a (the second device 8b) which maintains to communicate with the first unit 2A (the second unit 2B). The signal processor 24 makes a relation table relating an original communication address to a translated communication address. The relation table is transmitted from the switching signal communication unit 23 of the first unit 2A (the second unit 2B) to the connection device 5. The second device 8b (the first device 8a), which had communicated with the second unit 2B (the first unit 2A), is equivalent to a second slave unit of the present invention. The first device 8a (the second device 8b), which maintains to communicate with the first unit 2A (the second unit 2B), is equivalent to a first slave unit of the present invention.

Figure 7:
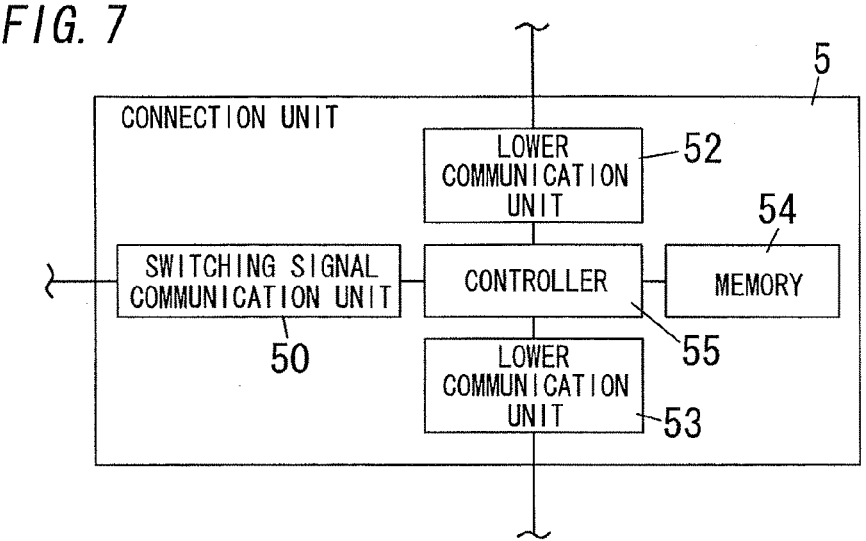
FIG. 7 is a block diagram showing a connection unit's configuration according to second embodiment.

As shown in FIG. 7, the connection unit 5 of the present embodiment comprises a switching signal communication unit 50, lower communication units 52, 53, a memory 54, and a controller 55. The lower communication unit 52 is connected to the lower net Nia (see FIG. 1), and the lower communication unit 53 is connected to the lower net Nib (see FIG. 1). The controller 55 makes the memory 54 memorize the relation table when the relation table is received in the switching signal communication unit 50. In addition, when the lower communication unit 52 (the lower communication unit 53) receives a signal from the lower net Nia (the lower net Nib), the controller 55 uses the relation table to translate the communication address (the communication address translated in the first unit 2A (the second unit 2B)), which is included in the signal received in the lower communication unit 52 (the lower communication unit 53), to the original communication address. The controller 55 controls the lower communication unit 53 (the lower communication unit 52) so as to transmit a signal including the translated original communication address to the lower net Nib (the lower net Nia) in the side of the second unit 2B (the first unit 2A).

Figure 8:
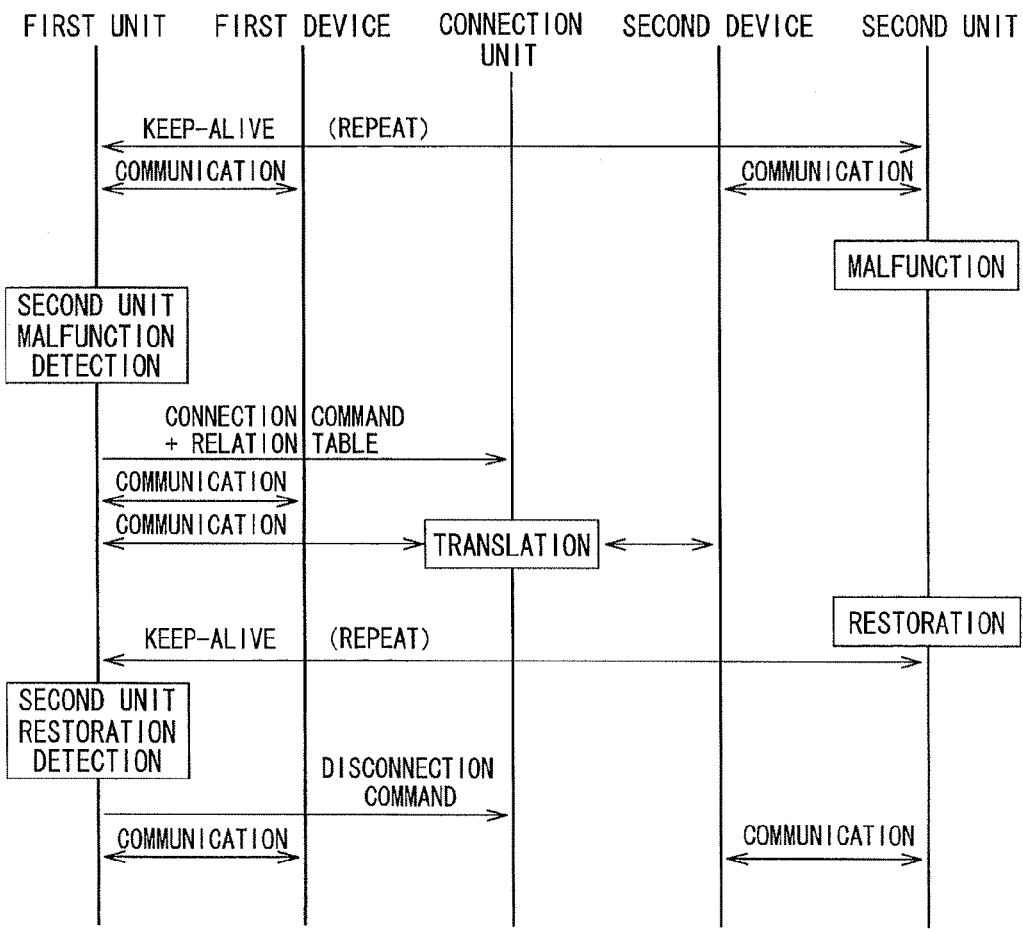
FIG. 8 is a figure for explaining an operation of a device management system according to said second embodiment.

Then, in the device management system of the present embodiment, an operation of the system is explained below by using FIG. 8 when the second unit 2B malfunctions. In addition, the operation of the system is equal to that of the first embodiment when both of the first and second units 2A, 2B function normally.

When the second unit 2B malfunctions, the first unit 2A detects the malfunction of the second unit 2B. Then, the first unit 2A translates the communication address of the second device 8b so as not to overlap the communication address of the first device 8a, and makes the relation table. Then, the first unit 2A transmits both of the connection command and the relation table to the connection unit 5. The connection unit 5 memorizes the relation table and connects the lower net Nia and the lower net Nib when receiving both the connection command and the relation table. Then, the first unit 2A maintains to communicate with the first device 8a as heretofore, and further communicates with the second device 8b via the connection unit 5. Then, the connection unit 5 translates the communication address translated in the first unit 2A to the original communication address, with respect to a signal transmitted from the first unit 2A to the second device 8b, and transmits a signal including the original communication address to the second device 8b. In addition, when the second unit 2B is restored, an operation of the system of the present embodiment is the same as that of the first embodiment.

As explained above, according to the present embodiment, even if the same communication address was set in the second device 8b which had communicated with the malfunctioning second unit 2B until then and the first device 8a which maintains to communicate with the first unit 2A functioning normally, the device management system is configured to translate the communication address of the first slave unit so as not to overlap the communication address of the second slave unit. For this reason, the communication addresses of the first and second devices 8a, 8b can be different from each other. Thus, the device management system can distinguish between the first and second devices 8a, 8b in which the same communication address was set.

In addition, according to the following third to sixth embodiments, the address translation function of the signal processor 24 of the second embodiment may be adjusted.
(Third Embodiment)

In a third embodiment, a communication protocol (hereinafter called "first communication protocol") used in the side of the first unit 2A, as shown in FIG. 1, is different from a communication protocol (hereinafter called "second communication protocol") used in the side of the second unit 2B, and this is explained below. In the present embodiment, the first unit 2A shown in FIG. 1 is the lighting control unit 2a, and the second unit 2B is the measuring management unit 2b. In addition, the same composition elements as the first embodiment are putted the same numerals on, and the explanation thereof is omitted.

Figure 9:
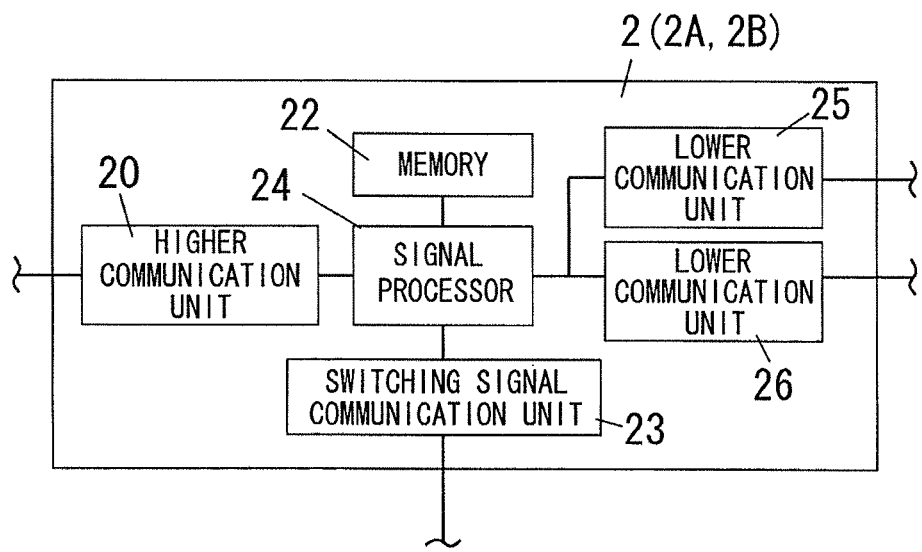
FIG. 9 is a block diagram showing a unit's configuration according to fourth embodiment.

Hereinafter, the present embodiment is explained to center around the first unit 2A. The second unit 2B can be explained by translating to the phrase shown in parentheses. As shown in FIG. 9, the first unit 2A (the second unit 2B) comprises the higher communication unit 20, the memory 22, the switching signal communication unit 23, and the signal processor 24, as well as the first unit 2A (the second unit 2B) of the first embodiment (see FIG. 4). The first unit 2A (the second unit 2B) further comprises lower communication units 25, 26. The lower communication unit 25 communicates according to the first communication protocol, and the lower communication unit 26 communicates according to the second communication protocol. When both of the first and second units 2A, 2B functions normally, the first unit 2A (the second unit 2A) communicates with the first device 8a (the second device 8b) by using only the lower communication unit 25 (the lower communication unit 26).

Figure 10:
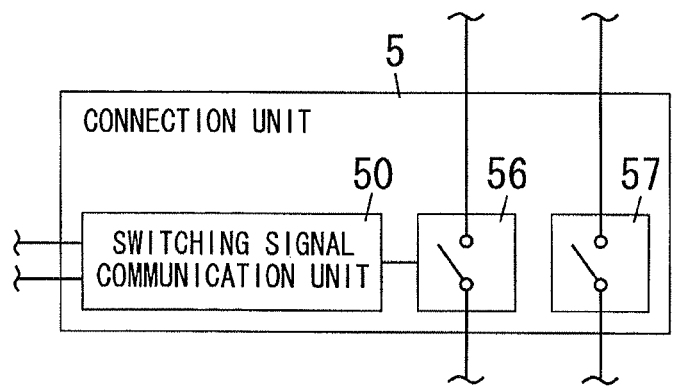
FIG. 10 is a block diagram showing a connection unit's configuration according to said fourth embodiment.

As shown in FIG. 10, the connection unit 5 of the present embodiment comprises connection parts 56, 57. The connection part 56 connects the lower net Nia in the side of the first unit 2A and the lower communication unit 25 of the second unit 2B. The connection part 57 connects the lower net Nib in the side of the second unit 2B and the lower communication unit 26 of the first unit 2A.

In the device management system of the present embodiment, when the second unit 2B malfunctions, the lower communication units 25, 26 of the first unit 2A is equivalent to a communication means of the present invention, and the connection part 57 of the connection unit 5 is equivalent to a connection means of the present invention.

On the other hand, when the first unit 2A malfunctions, the lower communication units 25, 26 of the second unit 2B are equivalent to a communication means of the present invention, and the connection part 56 of the connection unit 5 is equivalent to a connection means of the present invention.

Next, in the device management system of the present embodiment, when the second unit 2B malfunctions, an operation of the system is explained below. In addition, when both of the first and second units 2A, 2B function normally, the operation of the system is equal to that of the first embodiment.

When the second unit 2B malfunctions, the first unit 2A detects the malfunction of the second unit 2B, and transmits the connection command to the connection unit 5. In the connection unit 5 receiving the connection command, the connection part 57 connects the lower net Nib in the side of the second unit 2B and the lower communication unit 26 of the first unit 2A. Then, the first unit 2A communicates with the first device 8a as before, and further communicates with the second device 8b via the connection uni5.

Then, when the second unit 2B is restored, the first unit 2A detects the restoration of the second unit 2B, and transmits the disconnection command to the connection unit 5. In the connection unit 5 receiving the disconnection command, the connection part 57 disconnects the connection between the lower net Nib and the lower communication unit 26 of the first unit 2A. Then, the first unit 2A stops to communicate with the second device 8b, and communicates with only the first device 8a. The second unit 2B restarts to communicate with the second device 8b.

In addition, when the first unit 2A malfunctions, in the connection unit 5 the connection part 56 connects the lower net Nia in the side of the first unit 2A and the lower communication unit 25 of the second unit 2B.

As explained above, according to the present embodiment, the first unit 2A (the second unit 2B) has a function to communicate with the first device 8a and the second device 8b according to each of a plurality of protocols, and thereby even if the first communication protocol (the second communication protocol) used in the side of the first unit 2A (the second unit 2B) functioning normally is different from the second communication protocol (the first communication protocol) used in the side of the malfunctioning second unit 2B (the malfunctioning first unit 2A), the first unit 2A (the second unit 2B) functioning normally can maintain to manage the second device 8b (the first device 8a), instead of the second unit 2B (the first unit 2A).
(Fourth Embodiment)

In a fourth embodiment, the first communication protocol used in the side of the first unit 2A is different from the second communication protocol used in the side of the second unit 2B, and this is explained below. However, the fourth embodiment is different from the third embodiment. In the present embodiment, the first unit 2A is the lighting control unit 2a, and the second unit 2B is the measuring management unit 2b.

The connection unit 5 of the present embodiment has the same composition as that shown in FIG. 7. The controller 55 of the present embodiment is a protocol translation means for translating the first and second communication protocols. In addition, the same composition elements as the first embodiment are putted the same numerals on, and the explanation thereof is omitted.

Next, in the device management system of the present embodiment, when the second unit 2B malfunctions, an operation of the system is explained below. In addition, when both of the first and second units 2A, 2B functions normally, the operation of the system is equal to that of the first embodiment.

When the second unit 2B malfunctions, the first unit 2A detects the malfunction of the second unit 2B and transmits the connection command to the connection unit 5. The connection unit 5 connects the lower net Nia and the lower net Nib when receiving the connection command. Then, when receiving a signal (a signal conforming to a first protocol) transmitted from the first unit 2A to the second device 8b, the connection unit 5 translates the signal to a signal conforming to a second protocol. The translated signal is transmitted from the connection unit 5 to the second device 8b. In addition, when the second unit 2B is restored, the operation of the system is equal to that of the first embodiment.

As explained above, according to the present embodiment, when the first communication protocol (the second communication protocol) used in the side of the first unit 2A (the second unit 2B) functioning normally is different from the second communication protocol (the first communication protocol) used in the side of the malfunctioning second unit 2B (the malfunctioning first communication protocol 2A), the first unit 2A (the second unit 2B) can maintain to manage the second device 8b (the first device 8a) instead of the second unit 2B (the first unit 2A) even if the first unit 2A (the second unit 2B) does not have a function to communicate according to a plurality of communication protocols.

(Fifth Embodiment)

In a fifth embodiment, the first communication protocol used in the side of the first unit 2A is different from the second communication protocol used in the side of the second unit 2B, and this is explained below. However, the fifth embodiment is different from the third and fourth embodiments.

The first unit 2A of the present embodiment is the lighting control unit 2a shown in FIG. 2. The second unit 2B of the present embodiment is the measuring management unit 2b shown in FIG. 2. The lower net Ni1 (see FIG. 2) connected to the lighting control unit 2a builds a communication network conforming to a protocol (first protocol) of time-division multiplexing access method (polling/selecting method). The lower net Ni2 connected to the measuring management unit 2b builds a communication network conforming to a protocol (second protocol) of a serial communication of RS-485, RS-232C etc. Hereinafter, the present embodiment is explained to center around the first unit 2A. The second unit 2B can be explained by translating to the phrase shown in parentheses.

The first unit 2A (the second unit 2B) of the present embodiment has a constitution shown in FIG. 4. The signal processor 24 of the present embodiment controls the lower communication unit 21 so as to communicate with the first and second devices 8a, 8b by using a superposed signal which is obtained by superposing a signal conforming to a second communication protocol to a signal conforming to a first communication protocol.

Each of the first and second devices 8a, 8b of the present embodiment has a filter means. The filter means extracts the only signal conforming to the communication protocol used for its own communication, of the superposed signal superposed through the signal processor 24.

Here, there is a method for superposing a packet conforming to RS-485 (a signal conforming to the second protocol) to a transmission signal of time-division multiplexing access method (a signal conforming to the first protocol), and the method is explained below. The transmission signal is a time-division multiplexing signal which comprises an interrupt pulse period, a preparatory period, a signal transmitting period, a signal returning period, an interrupt pulse period, a short circuit detection period, and a preparatory area period, and which has a plurality of poles (±24V). The interrupt pulse period is a period for detecting an interrupt signal. The preparatory period is a period which is set according to the interrupt pulse period and the short circuit detection period. The signal transmitting period is a period for transmitting a data. The signal returning period is a time slot for receiving a returning signal. The interrupt pulse period is a period for detecting an interrupt signal. The short circuit detection period is a period for detecting a short circuit. The preparatory area period is a period for being used when a processing is too late.

At first, when the transmission signal's level of time-division multiplexing access method does not change for a predetermined period, the signal processor 24 detects the predetermined period and determines that the signal returning period starts from the predetermined period. Then, the signal processor 24 distinguishes between a communication suitability period and a communication unsuitability period based on the above determination result. The communication suitability period includes a stable period which is relatively-long at a high level or a low level of the transmission signal. Thus, the communication suitability period is a period which is suitable for transmitting a packet conforming to RS-485. The communication unsuitability period includes a stable period which is relatively-short at the high level or the low level of the transmission signal, and is susceptible to a transmission of a signal conforming to the first protocol. Thus, the communication unsuitability period is a period which is not suitable for transmitting the packet conforming to RS-485. The signal processor 24 determines that a period of a starting pulse of the transmission signal and the signal returning period are the communication suitability periods. In addition, the signal processor 24 determines that a break period between a signal and the next is the communication suitability period. The signal processor 24 superposes RS-485's packet, which is a signal conforming to the second protocol, to the transmission signal, and transmits the superposed signal to a transmission line, when determining a period as the communication suitability period.

When the second unit 2B (the first unit 2A) malfunctions, the first device 8a extracts a data included in the signal transmitting period from the superposed signal which is superposed by the signal processor 24 of the first unit 2A (the second unit 2B). The second device 8b extracts the RS-485's packet included in the communication suitability period from the above superposed signal.

Then, in device management system of the present embodiment, when the second unit 2B malfunctions, an operation of the system is explained below. In addition, the operation of the system is equal to that of the first embodiment when both of the first and second units 2A, 2B function normally.

When the second unit 2B malfunctions, the first unit 2A detects the malfunction of the second unit 2B and transmits the connection command to the connection unit 5. The connection unit 5 connects the lower net Nia and the lower net Nib, when receiving the connection command. Then, the first unit 2A superposes a signal conforming to the second protocol to a signal conforming to the first protocol, and transmits the superposed signal. The second device 8b extracts the signal conforming to the second protocol from the superposed signal. In addition, when the second unit 2B is restored, the operation of the system is equal to that of the first embodiment.

As explained above, according to the present embodiment, even if the first communication protocol (the second communication protocol) used in the side of the first unit 2A (the second unit 2B) functioning normally is different from the second communication protocol (the first communication protocol) used in the side of the malfunctioning second unit 2B (the malfunctioning first unit 2A), the first unit 2A (the second unit 2B) can maintain to manage the second device 8b (the first device 8b) instead of the second unit 2B (the first unit 2A) by standardizing a transmission path used in the first communication protocol and a transmission path used in the second communication protocol.

(Sixth Embodiment)

Figure 11:
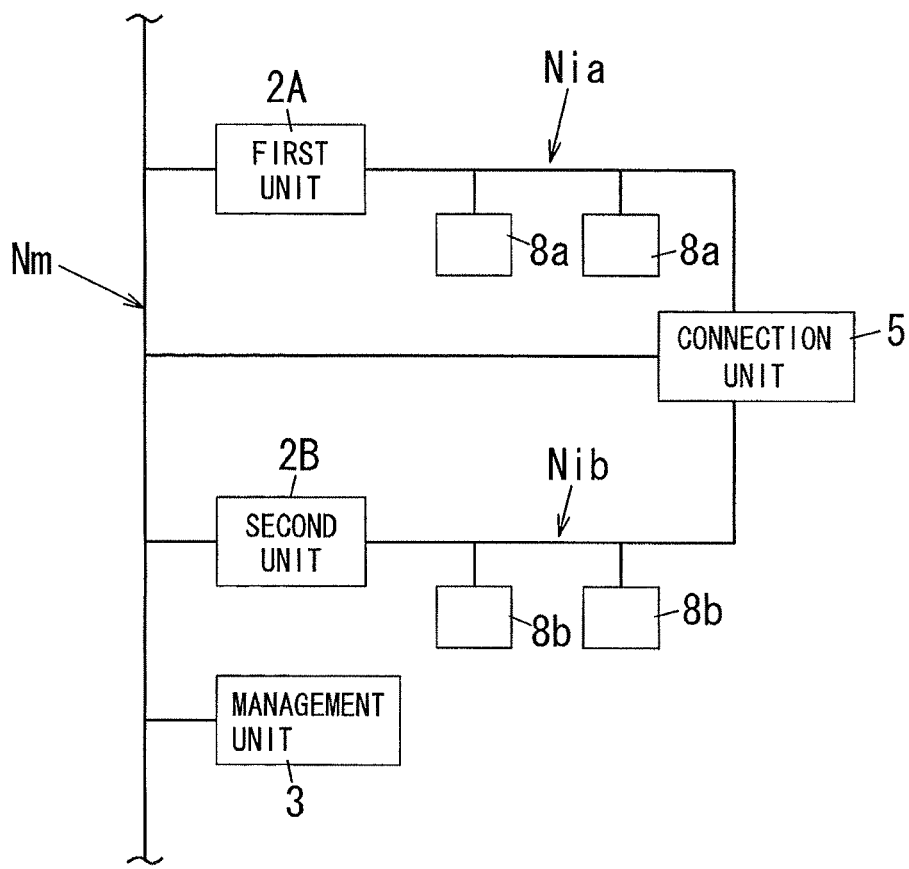
FIG. 11 is a figure showing a main part of a device management system according to sixth embodiment.

In a device management system of a sixth embodiment, the first and second units 2A, 2B do not detect each other's malfunction, but a management unit 3 separating from the first and second units 2A, 2B detects the malfunction of the first and second units 2A, 2B as shown in FIG. 11. In the above point, the system of the present embodiment is different from that of the first embodiment (see FIG. 1). The management unit 3 of the present embodiment is equivalent to a detecting means of the present invention. In addition, the same composition elements as the first embodiment are putted the same numerals on, and the explanation thereof is omitted.

The connection unit 5 of the present embodiment has the same composition as that shown in FIG. 5. The switching signal communication unit 50 of the present embodiment does not communicate with each of the units 2A, 2B, but communicates with management unit 3.

The management unit 3 of the present embodiment transmits a keep-alive packet to each of the first and second units 2A, 2B, and detects the malfunction of the first and second units 2A, 2B from a response to the keep-alive packet. The management unit 3 determines that the first unit 2A functions normally if receiving the response to the keep-alive packet from the first unit 2A. The management unit 3 determines that the first unit 2A malfunctions if receiving no response to the keep-alive packet from the first unit 2A. The same holds for the second unit 2B.

The management unit 3 transmits the connection command for connecting the lower net Nia and the lower net Nib to the connection unit 5 when detecting the malfunction of the second unit 2B (the first unit 2A). The management unit 3 transmits the disconnection command for disconnecting the connection between the lower net Nia and the lower net Nib to the connection unit 5 when detecting the restoration of the second unit 2B (the first unit 2A).

Figure 12:
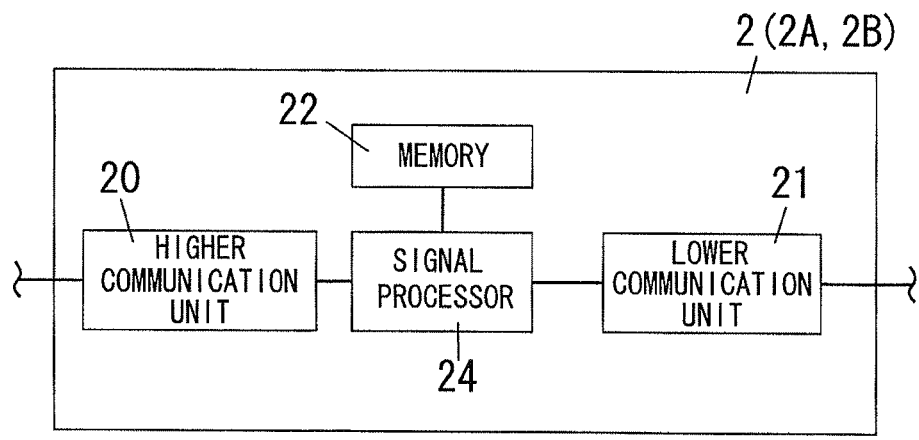
FIG. 12 is a block diagram showing a unit's configuration according to said sixth embodiment.

As shown in FIG. 12, the first unit 2A (the second unit 2B) of the present embodiment is not provided with the switching signal communication unit 23 (see FIG. 4).

Figure 13:
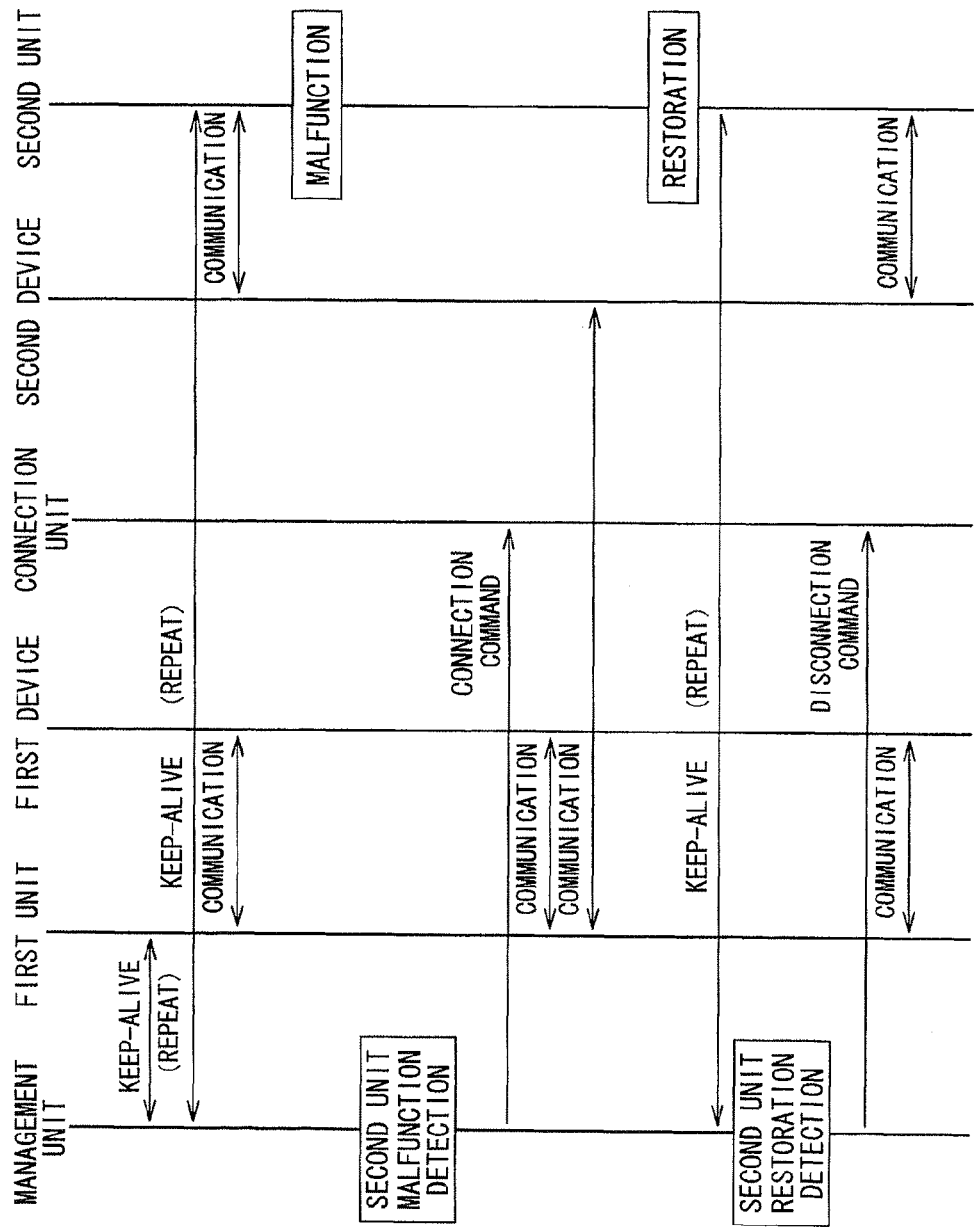
FIG. 13 is a figure for explaining an operation of the device management system according to said sixth embodiment.

Then, in the device management system of the present embodiment, an operation of the system is explained below by using FIG. 13, when the second unit 2B malfunctions. At first, the management unit 3 determines whether or not the first and second units 2A, 2B malfunction, by repeating to transmit the keep-alive packets to the units 2A, 2B and to confirm the responses from the units 2A, 2B. In addition, the first unit 2A communicates with the first device 8a, and the second unit 2B communicates with the second device 8b.

Then, when the second unit 2B malfunctions, the management unit 3 detects the malfunction of the second unit 2B and transmits the connection command to the connection unit 5. The connection unit 5 connects the lower net Nia and the lower net Nib when receiving the connection command. Then, the first unit 2A communicates with the first device 8a as heretofore, and further communicates with the second device 8b via the connection unit 5.

Then, when the second unit 2B is restored, the management unit 3 detects the restoration of the second unit 2B and transmits the disconnection command to the connection unit 5. The connection unit 5 disconnects the connection between the lower net Nia and the lower net Nib when receiving the disconnection command. Then, the first unit 2A stops to communicate with the second device 8b, and communicates with only the first device 8a. The second unit 2B restarts to communicate with the second device 8b.

As explained above, according to the present embodiment, the management unit 3 separating from the first and second units 2A, 2B has a detecting function, and thereby a load of each units 2A, 2B can be decreased compared with the case that the units 2A, 2B detect each other's malfunction.

In addition, according the device management system of the second to fifth embodiments, the first and second units 2A, 2B do not detect each other's malfunction, but the management unit 3 may detect the malfunction of the first and second units 2A, 2B as well as the sixth embodiment.

(Seventh Embodiment)

Figure 14:
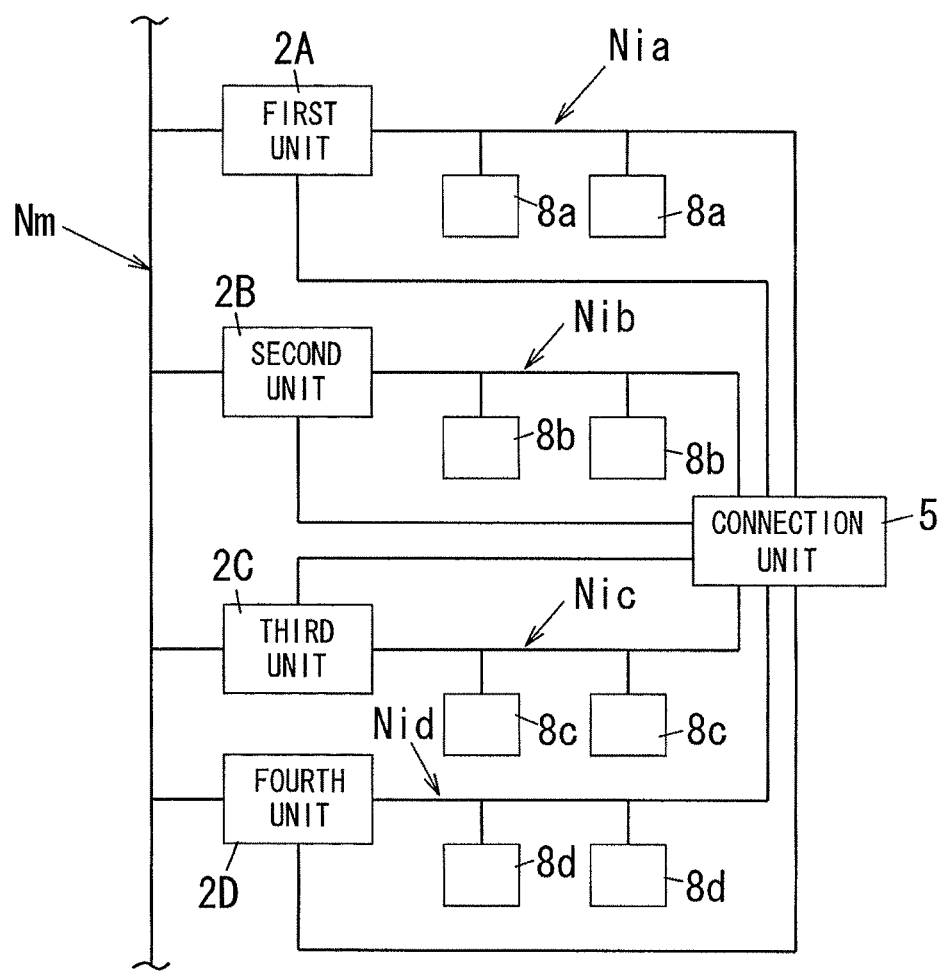
FIG. 14 is a figure showing a main part of a device management system according to seventh embodiment.

In a device management system of a seventh embodiment, a signal processor 24 of each of four units 2A to 2D shown in FIG. 14 detects the malfunction of mutually different one of the four units 2A to 2D according to a predetermined flow. In the above point, the system of the present embodiment is different from that of the first embodiment (see FIG. 1). In addition, the same composition elements as the first embodiment are putted the same numerals on, and the explanation thereof is omitted.

In the present embodiment, four units 2A to 2D shown in FIG. 14 are called a first unit 2A, a second unit 2B, a third unit 2C, and a fourth unit 2D, respectively. Each of the first to fourth units 2A to 2D of the present embodiment has the composition shown in FIG. 4. The first to fourth units 2A to 2D communicate according to the same communication protocol. When all of the first to fourth units 2A to 2D function normally, the signal processor 24 of the first unit 2A detects whether or not the second unit 2B malfunctions and the signal processor 24 of the second unit 2B detects whether or not the third unit 2C malfunctions and the signal processor 24 of the third unit 2C detects whether or not the fourth unit 2D malfunctions and the processor 24 of the fourth unit 2D detects whether or not the first unit 2A malfunctions. Each signal processor 24 of the first to fourth units 2A to 2D is equivalent to the detecting means of the present invention.

Figure 15:
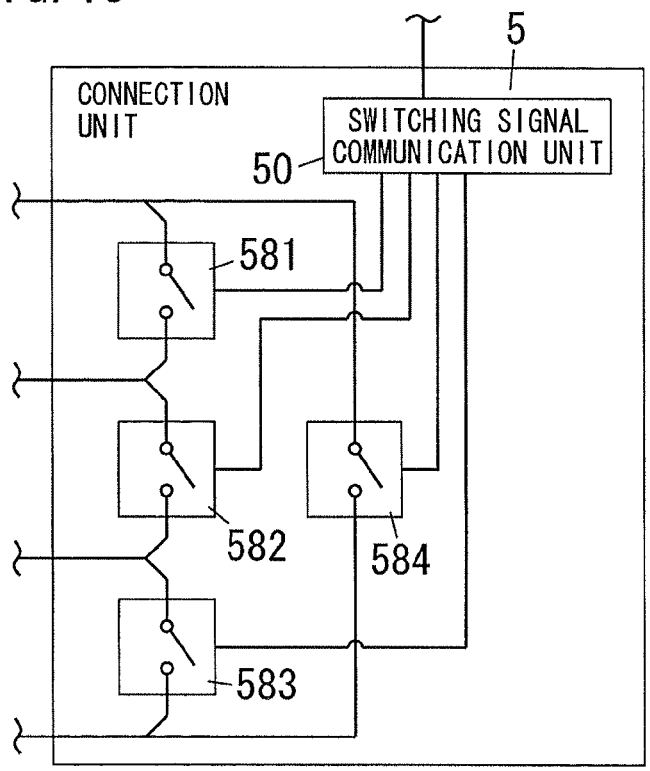
FIG. 15 is a block diagram showing a connection unit's configuration according to said seventh embodiment.

The connection unit 5 of the present embodiment, as shown in FIG. 15, comprises the switching signal communication unit 50 and four connection parts 581 to 584. The connection part 581 connects the lower net Nia in the side of the first unit 2A and the lower net Nib in the side of the second unit 2B. The connection part 582 connects the lower net Nib in the side of the second unit 2B and the lower net Nic in the side of the third unit 2C. The connection part 583 connects the lower net Nic in the side of the third unit 2C and the lower net Nid in the side of the fourth unit 2D. The connection part 584 connects the lower net Nid in the side of the fourth unit 2D and the lower net Nia in the side of the first unit 2A.

The first unit 2A can communicate with the second devices 8b, 8b connected to the lower net Nib when the lower net Nia and the lower net Nib are connected with the connection part 581. The second unit 2B can communicate with the third devices 8c, 8c connected to the lower net Nic when the lower net Nib and the lower net Nic are connected with the connection part 582. The third unit 2C can communicate with the fourth devices 8d, 8d connected to the lower Nid when the lower net Nic and the lower net Nid are connected with the connection part 583. The fourth unit 2D can communicate with the first devices 8a, 8a connected to the lower net Nia when the lower net Nid and the lower net Nia are connected with the connection part 584.

Here, as an example, an operation of the system is explained below when the second unit 2B shown in FIG. 14 malfunctions. The first unit 2A detects the malfunction of the second unit 2B and transmits the connection command for connecting the lower net Nia and the lower net Nib to the connection unit 5 and further starts to detect whether or not the third unit 2C malfunctions. That is, the first unit 2A detects whether or not the third unit 2C malfunctions, instead of the second unit 2B.

Then, in the connection unit 5, the connection part 581 connects the lower net Nia in the side of the first unit 2A and the lower net Nib in the side of the second unit 2B when the switching signal communication unit 50 receives the connection command from the first unit 2A.

As explained above, according to the present embodiment, even if either one of the units (for example, the second unit 2B) malfunctions, the first unit 2A detects the malfunction of the second unit 2B, and then starts to detect whether or not the third unit 2C malfunctions instead of the second unit 2B, and thereby the system can maintain to detect a malfunction with respect to the third unit 2C. The same holds for the malfunction of the first unit 2A, the third unit 2C, and the fourth unit 2D.

Figure 16:
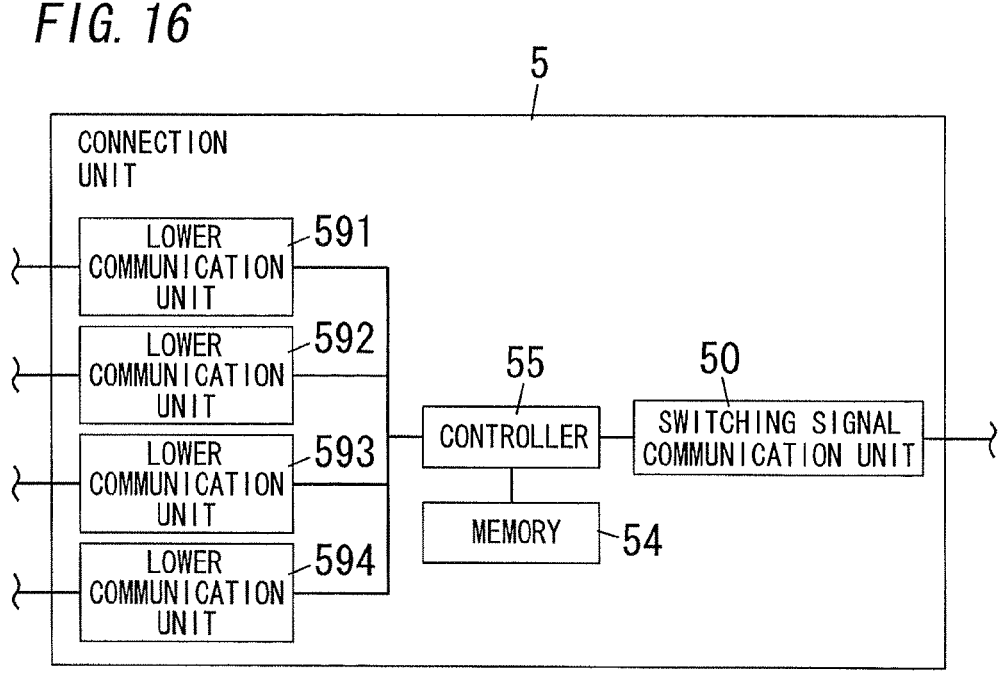
FIG. 16 a block diagram showing a connection unit's configuration according to a variation of said seventh embodiment.

In a variation of the present embodiment, the connection unit 5 may be used as shown in FIG. 16 when the first to fourth units 2A to 2D communicate according to communication protocols which are different from each other, respectively. The connection unit 5 shown in FIG. 16 comprises four lower communication units 591 to 594. The lower communication unit 591 is connected to the lower net Nia, and the lower communication unit 592 is connected to the lower net Nib, and the communication unit 593 is connected to the lower net Nic, and the communication unit 594 is connected to the lower net Nid. The switching signal communication unit 50, the memory 54, and the controller 55 shown in FIG. 16 have the same function as those of the fourth embodiment, respectively. Therefore, the controller 55 shown in FIG. 16 translates a protocol as well as the controller 55 of the fourth embodiment.

For this reason, even if the first to fourth units 2A to 2D communicate according to different communication protocols, respectively, and either one of the units 2 (for example, the second unit 2B) malfunctions, the first unit 2A can maintain to detect a malfunction with respect to the third unit 2C which had been managed by the malfunctioning second unit 2B until then, as well as the above present embodiment.

As explained above, in the first to seventh embodiments, the first and second units 2A, 2B (the lighting control unit 2a, the measuring management unit 2b) are master units of the present invention. The first and second devices 8a, 8b are connected to the lower nets Ni1, Ni2, respectively, and are slave units of the present invention. Then, when either one of the units 2A, 2B malfunctions, the operation of the system is explained above. On the other hand, as a variation of the first to seventh embodiments, the area unit 1 may be a master unit of the present invention, and each of the units 2 (the lighting control unit 2a, the measuring management unit 2b) may be a slave unit of the present invention. Thus, when either one of area units 1 (the second area unit 1) malfunctions, other area unit 1 (the first area unit 1) can manage instead of the either one. In this case, the connection unit 5 is located for connecting two middle nets Nm.

According to the above configuration, the connection unit 5 connects the first area unit 1 and the middle net Nm in the side of the second unit 1, and thereby the first area unit 1 can communicate with each unit 2 (the lighting control unit 2a, the measuring management unit 2b) with which the second area unit 1 had communicated until then when the second area unit 1 malfunctions. As a result, even if the second area unit 1 malfunctions, the device management system can maintain to manage without stopping communication with each unit 2 with which the second area unit 1 had communicated until then.

The invention claimed is:

1. A device management system configured to manage a plurality of devices arranged and divided into a plurality of management groups,
    wherein the device management system comprises a plurality of master units, a plurality of slave units, and a connection unit,
    wherein the plurality of master units are arranged in management groups which are different from each other, the plurality of master units comprising a first master unit arranged in a first management group and a second master unit arranged in a second management group,
    wherein the plurality of slave units comprise at least one first slave unit arranged in the first management group and at least one second slave unit arranged in the second management group,
    wherein the first master unit is configured to communicate with the first slave unit by using a first communication network to manage the first slave unit, wherein the second master unit is configured to communicate with the second slave unit by using a second communication network to manage the second slave unit,
    wherein the first master unit is connected to the first slave unit through a signal line, wherein the second master unit is connected to the second slave unit through a signal line,
    wherein the first slave unit is connected to a first device arranged in the first management group and manages the first device according to a management of the first master unit, wherein the second slave unit is connected to a second device arranged in the second management group and manages the second device according to a management of the second master unit,
    wherein the first master unit comprises a detecting means that detects whether or not the second master unit malfunctions and the second master unit comprises a detecting means that detects whether or not the first master unit malfunctions,
    wherein the connection unit switches a connection that connects the first master unit to the second communication network based on the connection unit receiving a connection command from the first master unit, and wherein the connection unit switches a connection that connects the second master unit to the first communication network based on the connection unit receiving a connection command from the second master unit,
    wherein each of the first master unit and the second master unit comprises a connection command transmitting means, a communication means, and a management means, wherein the connection command transmitting means is configured to transmit the connection command to the connection unit based on the malfunction of the second master unit being detected by the detecting means of the first master unit or the malfunction of the first master unit being detected by the detecting means of the second master unit, wherein the communication means of the first master unit is configured to communicate with the first slave unit, wherein the communication means of the first master unit is configured to communicate with the second slave unit by using the second communication network via the connection unit when the first master unit and the second communication network are connected with the connection unit, wherein the communication means of the second master unit is configured to communicate with the second slave unit, wherein the communication means of the second master unit is configured to communicate with the first slave unit by using the first communication network via the connection unit when the second master unit and the first communication network are connected with the connection unit, wherein the management means manages the first slave unit, and further manages the second slave unit communicating with the respective communication means.

2. The device management system as claimed in claim 1, wherein the connection unit connects the first master unit and the second communication network via the first communication network when receiving the connection command, wherein the communication means of the first master unit is configured to communicate with the first and second slave units by using a superposed signal which is obtained by superposing a signal conforming to a second communication protocol to a signal conforming to a first communication protocol when the first master unit and the second communication network are connected with the connection unit, wherein the first slave unit comprises a filter means, wherein the filter means extracts the signal conforming to the first communication protocol from the superposed signal, wherein the second slave unit comprises a filter means, wherein the filter means extracts the signal conforming to the second communication protocol from the superposed signal.

3. The device management system as claimed in claim 1, wherein the communication means of the first master unit is configured to communicate with the first slave unit according to a first communication protocol by using the first communication network, wherein the communication means of the first master unit is configured to communicate with the second slave unit according to the second communication protocol by using the second communication network via the connection unit when the first master unit and the second communication network are connected with the connection unit.

4. The device management system as claimed in claim 1, wherein the communication means of the first master unit is configured to transmit a signal conforming to a first communication protocol to the second slave unit via the connection unit when the first master unit and the second communication network are connected with the connection unit, wherein the connection unit relays a signal transmitted from the first master unit to the second slave unit, and translates the signal conforming to the first communication protocol into a signal conforming to the second communication protocol.

5. The device management system as claimed in claim 1, wherein the first master unit comprises an address translation means, wherein the address translation means is configured to translate a communication address of the second slave unit so as not to overlap a communication address of the first slave unit, wherein the communication means of the first master unit is configured to transmit a signal using the translated communication address of the second slave unit to the second slave unit via the connection unit when the first master unit and the second communication network are connected with the connection unit, wherein the connection unit relays a signal transmitted from the first master unit to the second slave unit, and translates the translated communication address used in the relayed signal into the original communication address.

6. The device management system as claimed in claim 1, wherein the detecting means of the first master unit is a detector separated from the first master unit.

7. The device management system as claimed in claim 1, wherein the plurality of master units comprise a third master unit which is different from the first and second master units, wherein the detecting means of the first master unit is arranged in the first master unit, wherein the second master unit detects whether or not the third master unit malfunctions when functioning normally, wherein the first master unit starts to detect whether or not the third master unit malfunctions when the malfunction of the second master unit is detected.

8. The device management system as claimed in claim 2, wherein the first master unit comprises an address translation means, wherein the address translation means is configured to translate a communication address of the second slave unit so as not to overlap a communication address of the first slave unit, wherein the communication means of the first master unit is configured to transmit a signal using the translated communication address of the second slave unit to the second slave unit via the connection unit when the first master unit and the second communication network are connected with the connection unit, wherein the connection unit relays a signal transmitted from the first master unit to the second slave unit, and translates the translated communication address used in the relayed signal into the original communication address.

9. The device management system as claimed in claim 3, wherein the first master unit comprises an address translation means, wherein the address translation means is configured to translate a communication address of the second slave unit so as not to overlap a communication address of the first slave unit, wherein the communication means of the first master unit is configured to transmit a signal using the translated communication address of the second slave unit to the second slave unit via the connection unit when the first master unit and the second communication network are connected with the connection unit, wherein the connection unit relays a signal transmitted from the first master unit to the second slave unit, and translates the translated communication address used in the relayed signal into the original communication address.

10. The device management system as claimed in claim 4, wherein the first master unit comprises an address translation means, wherein the address translation means is configured to translate a communication address of the second slave unit so as not to overlap a communication address of the first slave unit,
- wherein the communication means of the first master unit is configured to transmit a signal using the translated communication address of the second slave unit to the second slave unit via the connection unit when the first master unit and the second communication network are connected with the connection unit,
- wherein the connection unit relays a signal transmitted from the first master unit to the second slave unit, and translates the translated communication address used in the relayed signal into the original communication address.

11. The device management system as claimed in claim 2, wherein the detecting means of the first master unit is a detector separated from the first master unit.

12. The device management system as claimed in claim 3, wherein the detecting means of the first master unit is a detector separated from the first master unit.

13. The device management system as claimed in claim 4, wherein the detecting means of the first master unit is a detector separated from the first master unit.

14. The device management system as claimed in claim 2, wherein the plurality of master units comprise a third master unit which is different from the first and second master units, wherein the detecting means of the first master unit is arranged in the first master unit, wherein the second master unit detects whether or not the third master unit malfunctions when functioning normally,
- wherein the first master unit starts to detect whether or not the third master unit malfunctions when the malfunction of the second master unit is detected.

15. The device management system as claimed in claim 3, wherein the plurality of master units comprise a third master unit which is different from the first and second master units, wherein the detecting means of the first master unit is arranged in the first master unit, wherein the second master unit detects whether or not the third master unit malfunctions when functioning normally,
- wherein the first master unit starts to detect whether or not the third master unit malfunctions when the malfunction of the second master unit is detected.

16. The device management system as claimed in claim 4, wherein the plurality of master units comprise a third master unit which is different from the first and second master units, wherein the detecting means of the first master unit is arranged in the first master unit, wherein the second master unit detects whether or not the third master unit malfunctions when functioning normally,
- wherein the first master unit starts to detect whether or not the third master unit malfunctions when the malfunction of the second master unit is detected.

* * * * *